United States Patent
Tu et al.

(10) Patent No.: US 10,817,674 B2
(45) Date of Patent: Oct. 27, 2020

(54) MULTIFUNCTION SIMULTANEOUS INTERPRETATION DEVICE

(71) Applicants: Chun-Ai Tu, Kaohsiung (TW); Chun-Yang Chang, Kaohsiung (TW); Chun-Ling Ho, Kaohsiung (TW); Yu Chin Chan, Kaohsiung (TW)

(72) Inventors: Chun-Ai Tu, Kaohsiung (TW); Chun-Yang Chang, Kaohsiung (TW); Chun-Ling Ho, Kaohsiung (TW); Yu Chin Chan, Kaohsiung (TW)

(73) Assignee: Chun-Ai Tu, Kaohsiung (TW)

( * ) Notice: Subject to any disclaimer, the term of this patent is extended or adjusted under 35 U.S.C. 154(b) by 279 days.

(21) Appl. No.: 16/008,066

(22) Filed: Jun. 14, 2018

(65) Prior Publication Data

US 2018/0293230 A1    Oct. 11, 2018

(51) Int. Cl.
*G10L 15/22* (2006.01)
*G06F 40/58* (2020.01)
*H04W 4/80* (2018.01)
*G10L 15/26* (2006.01)

(52) U.S. Cl.
CPC .............. *G06F 40/58* (2020.01); *G10L 15/22* (2013.01); *G10L 15/26* (2013.01); *H04W 4/80* (2018.02)

(58) Field of Classification Search
None
See application file for complete search history.

(56) References Cited

U.S. PATENT DOCUMENTS

| | | | | |
|---|---|---|---|---|
| 7,552,053 B2* | 6/2009 | Gao | ......................... | G10L 15/26 704/258 |
| 9,535,906 B2* | 1/2017 | Lee | ......................... | G06F 3/017 |
| 2007/0016401 A1* | 1/2007 | Ehsani | ................. | G10L 15/005 704/9 |
| 2010/0250231 A1* | 9/2010 | Almagro | ................. | G06F 40/58 704/2 |
| 2011/0307241 A1* | 12/2011 | Waibel | ..................... | G06F 40/58 704/2 |
| 2012/0284014 A1* | 11/2012 | Zivkovic | ................. | G06F 40/58 704/3 |
| 2013/0044351 A1* | 2/2013 | Coulson | ............. | H04N 1/00188 358/1.15 |
| 2013/0289971 A1* | 10/2013 | Parkinson | ............... | G06F 40/58 704/2 |

(Continued)

*Primary Examiner* — Neeraj Sharma

(57) ABSTRACT

A multifunction simultaneous interpretation device includes an audio input and recognition module for receiving input speech of a first language, recognizing same, and converting the input speech of the first language into input speech signals of the first language; an interpretation module electrically connected to the audio input and recognition module and configured to receive the input speech signals of the first language, interpret and convert same into speech signals of a second language different from the first language, and make the speech signals of the second language as output; an output module electrically connected to the interpretation module and configured to receive the speech signals of the second language from the interpretation module and output a voice representing the speech signals of the second language; and a wireless transceiver electrically connected to the interpretation module and configured for wireless signal transmission to a mobile phone.

1 Claim, 8 Drawing Sheets

(56) References Cited

U.S. PATENT DOCUMENTS

| | | | |
|---|---|---|---|
| 2015/0294089 A1* | 10/2015 | Nichols | G06F 3/0304 |
| | | | 705/3 |
| 2016/0170970 A1* | 6/2016 | Lindblom | H04L 51/063 |
| | | | 704/3 |
| 2017/0039866 A1* | 2/2017 | Coffee | G09B 5/04 |
| 2018/0240456 A1* | 8/2018 | Jeong | G10L 15/30 |

* cited by examiner

MULTIFUNCTION SIMULTANEOUS INTERPRETATION DEVICE

BACKGROUND OF THE INVENTION

1. Field of the Invention

The invention relates to simultaneous interpretation and more particularly to a multifunction simultaneous interpretation device capable of making a conversion smooth between two persons speaking different languages when one person using the interpretation device to talk with the other person holding a mobile phone, or simultaneously interpreting a first language being spoken by a lecturer using the interpretation device into a second language which is understandable by another person (or every participant of an audience).

2. Description of Related Art

Translation software and devices are well known in the art. Typically, the translated texts are shown on the screen of a mobile communication device.

Oral translation is included in the services of almost every translation agency. Interpretation is required at conferences, meetings and in any event involving people that speak different languages. Interpretation is often put in the context of conference interpreting as it is most often used at conferences. However, the conventional oral translation has the following drawbacks:

It is a one-way communication. That is, the listener cannot ask questions to the speaker due to limitation of relevant equipment.

Further, every participant of a meeting or conference is required to wear an oral translation machine because these participants do not understand the language being spoken by a lecturer. However, the implementation is very complicated and cost ineffective.

A conventional oral translation machine 2 is shown in FIG. 1 and comprises an input unit 21 for receiving audio streams of a first language, a processing unit 22 for converting the audio streams of the first language into audio streams of a second language, a learning unit 23 for recognizing the audio streams of the second language and temporarily storing the audio streams of the second language, and an output unit 24 for outputting the audio streams of the second language. As a result, a first language spoken by a first individual can be interpreted into a second language simultaneously for achieving communication purpose.

However, the conventional oral translation machine 2 is designed for face to face communication not for a remote communication.

Thus, the need for improvement still exists.

SUMMARY OF THE INVENTION

It is therefore one object of the invention to provide a multifunction simultaneous interpretation device comprising an audio input and recognition module configured to receive input speech of a first language, recognize same, and convert the input speech of the first language into input speech signals of the first language; an interpretation module electrically connected to the audio input and recognition module and configured to receive the input speech signals of the first language, convert same into speech signals of a second language different from the first language, and make the speech signals of the second language as output; an output module is electrically connected to the interpretation module and configured to receive the speech signals of the second language from the interpretation module and output a voice representing the speech signals of the second language; and a wireless transceiver electrically connected to the interpretation module and configured for wireless signal transmission to a first mobile phone which is configured for further wireless signal transmission to a second mobile phone.

Preferably, priority of the languages that can be recognized by the audio input and recognition module can be set by pressing a corresponding key.

Preferably, English has a higher priority than Spanish and other languages by setting.

Preferably, after receiving the language, the audio input and recognition module recognizes same and further converts the uttered language into input speech signals of the language. After receiving the input speech signals of the language, the interpretation module interprets and converts same into speech signals of a target language which are in turn sent to the output module or the mobile phone via the wireless transceiver. As an end, each individual of the audience can hear the target language clearly.

Preferably, the audio input and recognition module receives input speech of a first language and recognizes same by performing a speech recognition step. After receiving the input speech signals of the language, the interpretation module interprets and converts same into speech signals of a target language which are in turn sent to the output module. As an end, each individual of the audience can hear the translated Target language clearly.

Preferably, the audio input and recognition module detects a first language uttered by a first individual and convert the first language into input speech signals of the first language. Next, the audio input and recognition module sends the input speech signals of the first language to the interpretation module which in turn interprets and converts same into speech signals of a second language, and outputs the speech signals of the second language to the wireless transceiver. And in turn, the wireless transceiver wirelessly sends the speech signals of the second language to a mobile phone. As such, a second individual holding the mobile phone to his or her ear can hear the second language corresponding to the first language spoken by the first individual. The second individual may speak the second language to the mobile phone. And in turn, the mobile phone wirelessly sends speech signals of the second language to the wireless transceiver. Further, the wireless transceiver sends the received speech signals of the second language to the audio input and recognition module. The audio input and recognition module may detect the second language and convert the second language into input speech signals of the second language. Next, the audio input and recognition module sends the input speech signals of the first language to the interpretation module which in turn interprets and converts same into speech signals of the second language, and outputs the speech signals of the second language to the output module. As a result, the first individual can hear the first language corresponding to the second language spoken by the second individual.

Preferably, the interpretation module is provided with a plurality of language chips each for interpreting one of a plurality of first languages into one of a plurality of second languages, and an expansion unit operatively connected to the language chips. Thus, a user may operate the expansion unit to expand data stored in the language chips, thereby rendering a more precise interpretation.

Preferably, the mobile phone is embedded with an APP corresponding to a wireless transceiver in the headset.

The above and other objects, features and advantages of the invention will become apparent from the following detailed description taken with the accompanying drawings.

DETAILED DESCRIPTION OF THE INVENTION

Figure 1:
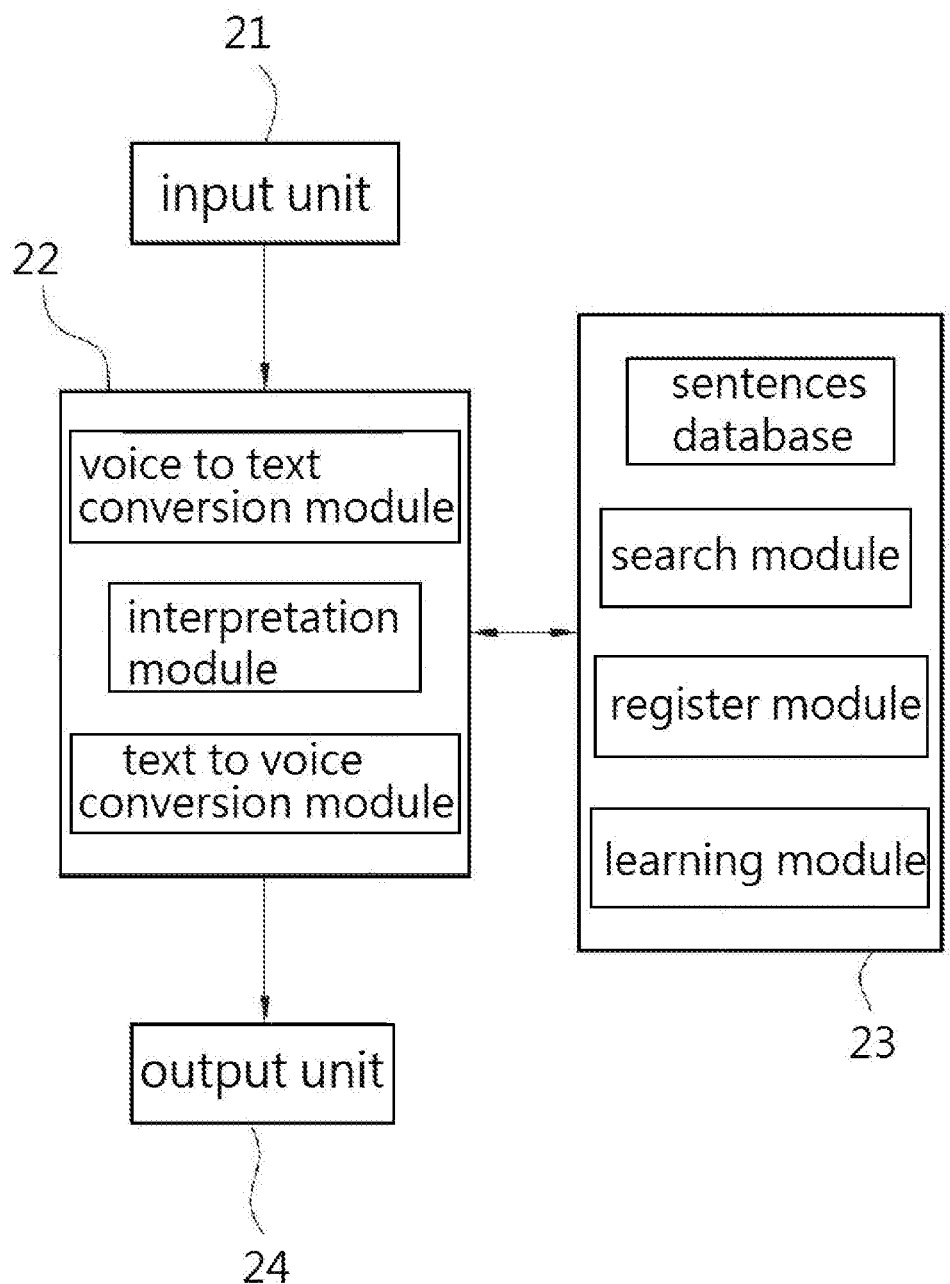
FIG. 1 is a block diagram of a conventional oral translation machine.
Figure 2:
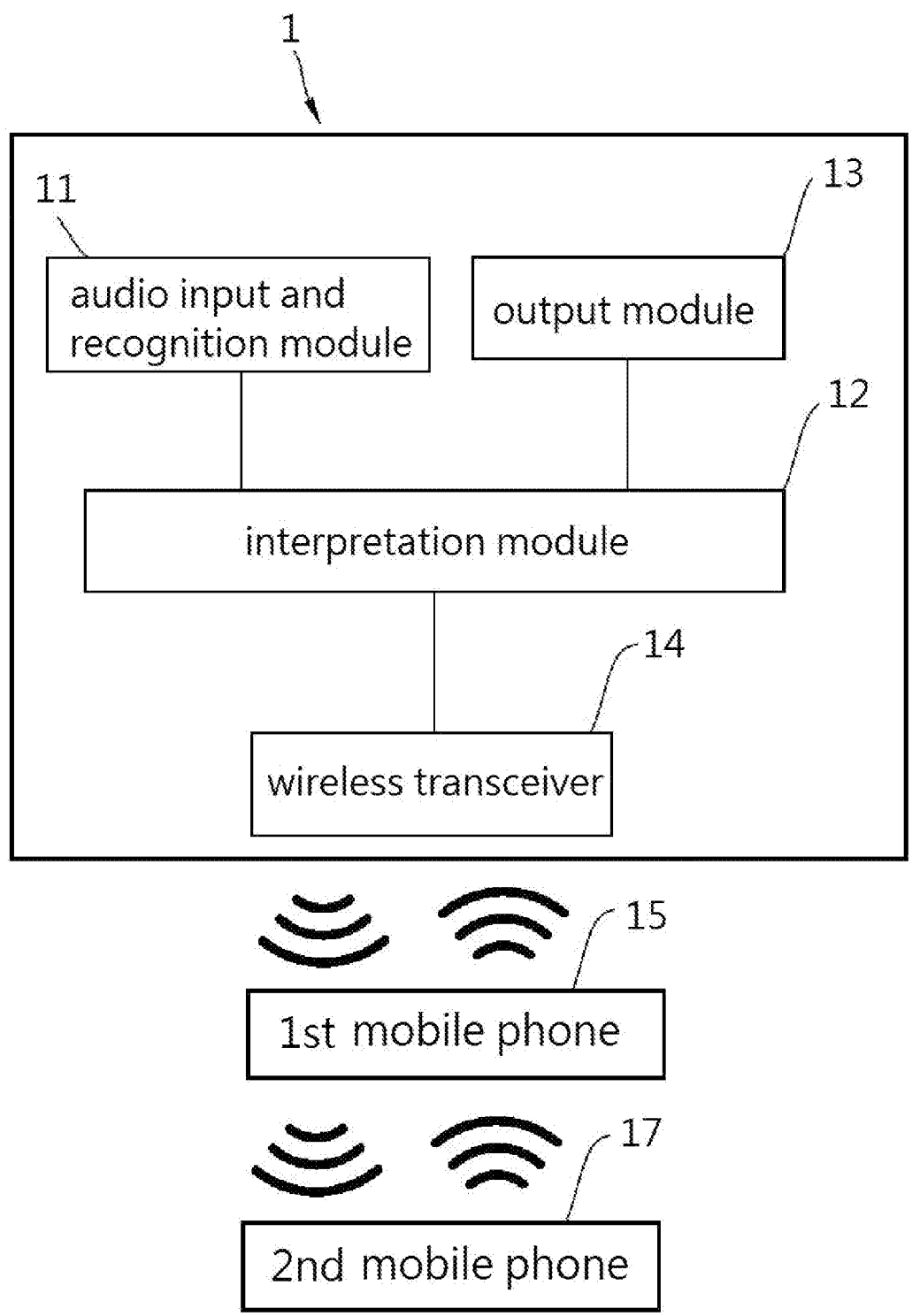
FIG. 2 is a block diagram of a multifunction simultaneous interpretation device according to the invention.

Referring to FIGS. 2 to 5A, a multifunction simultaneous interpretation device 1 in accordance with the invention comprises an audio input and recognition module 11, an interpretation module 12, an output module 13, a wireless transceiver 14 and a second mobile phone 17 as discussed in detail below.

The audio input and recognition module 11 is used to receive input speech of a first language and recognize same by performing a speech recognition step. The audio input and recognition module 11 further converts the uttered first language into input speech signals of the first language.

The interpretation module 12 is electrically connected to the audio input and recognition module 11 and is used to receive the input speech signals of the first language, interpret and convert same into speech signals of a second language (i.e., target language such as Chinese or English), and output the speech signals of the second language to a next component.

The output module 13 is electrically connected to the interpretation module 12 and is used to receive the speech signals of the second language from the interpretation module 12 and output a voice representing the speech signals of the second language. The output module 13 is operatively connected to a plurality of microphones each held by one individual of an audience so that each microphone may make the voice louder and each individual of the audience can hear the interpreted second language clearly.

The interpretation module 12 is further electrically connected to a wireless transceiver 14 which is capable of sending signals to a first mobile phone 15 which in turn sends the signals to a second mobile phone 17. Specifically, the signals are sent from the wireless transceiver 14 to the first mobile phone 15 by using Bluetooth® wireless technology by establishing a radio frequency link with the first mobile phone 15. Also, signals are sent from the first mobile phone 15 to the wireless transceiver 14 by using Bluetooth® wireless technology by establishing a radio frequency link with the wireless transceiver 14. In short, this is a two-way communication.

The languages that can be recognized by the audio input and recognition module 11 are English, Spanish, Japanese, etc. Further, priority of the languages can be set as, in an example, English, Spanish, Japanese by pressing a corresponding key. Thus, English can be processed first by the audio input and recognition module 11 if Spanish is also received by the audio input and recognition module 11. In such a manner, after receiving the language, the audio input and recognition module 11 recognizes same and further converts the uttered language into input speech signals of the language. After receiving the input speech signals of the language, the interpretation module 12 interprets and converts same into speech signals of a target language which are in turn sent to the output module 13 or the second mobile phone 17 via the wireless transceiver 14 and the first mobile phone 15. As an end, each individual of the audience can hear the target language clearly.

Therefore, the audio input and recognition module 11 receives input speech of a first language by referring to a manual setting or a predetermined setting and recognizes same by performing a speech recognition step. The first language is English in this embodiment. After receiving the input speech signals of the language, the interpretation module 12 interprets and converts same into speech signals of a target language (e.g., Chinese) which are in turn sent to the output module 13. As an end, each individual of the audience can hear the translated Chinese clearly.

In short, by utilizing the multifunction simultaneous interpretation device 1 an individual may speak a first language and a second individual (or audience) may hear a second language which is different from the first language and understandable to the second individual (or the audience).

An embodiment with respect to a conversion between two persons speaking two different languages by utilizing the invention and a mobile phone is described below. The audio input and recognition module 11 may detect the language (e.g., Chinese) uttered by a first individual and convert the language into input speech signals of Chinese. Next, the audio input and recognition module 11 sends the input speech signals of Chinese to the interpretation module 12 which in turn interprets and converts same into speech signals of a second language (i.e., target language such as English), and outputs the speech signals of English to the wireless transceiver 14. And in turn, the wireless transceiver 14 wirelessly sends the speech signals of English to a first mobile phone 15 owned by the first individual. Further, the first mobile phone 15 sends the speech signals of English to a second mobile phone 17. As such, a second individual holding the second mobile phone 17 to his or her ear can hear English corresponding to Chinese spoken by the first individual.

The second individual may speak the second language (e.g., English) to the second mobile phone 17. And in turn, the second mobile phone 17 wirelessly sends speech signals of English to the first mobile phone 15 which in turn sends the speech signals of English to the wireless transceiver 14. Further, the wireless transceiver 14 sends the received speech signals of English to the audio input and recognition module 11. The audio input and recognition module 11 may detect English and convert English into input speech signals of English. Next, the audio input and recognition module 11 sends the input speech signals of Chinese to the interpretation module 12 which in turn interprets and converts same into speech signals of English, and outputs the speech signals of English to the output module 13. As a result, the first individual can hear Chinese corresponding to English spoken by the second individual.

Figure 3:
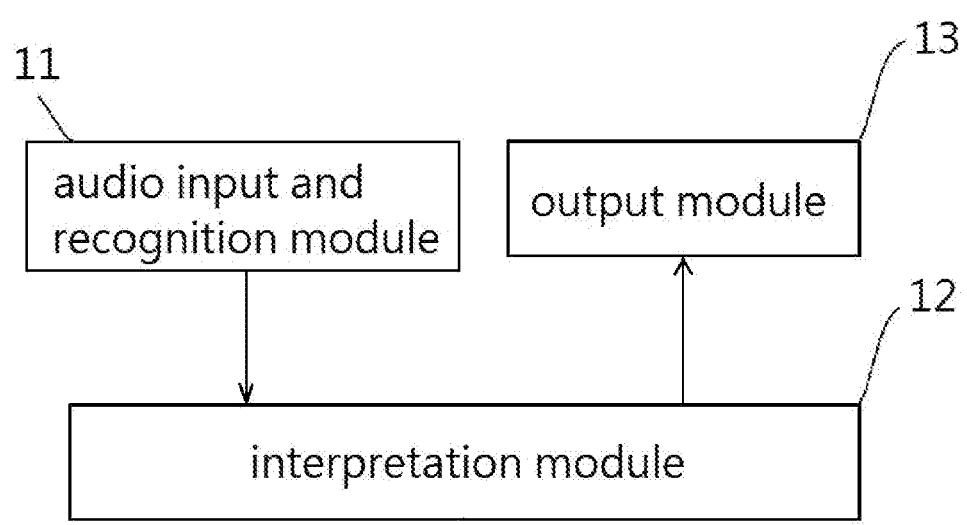
FIG. 3 is a block diagram of a first embodiment of the invention.
Figure 3A:
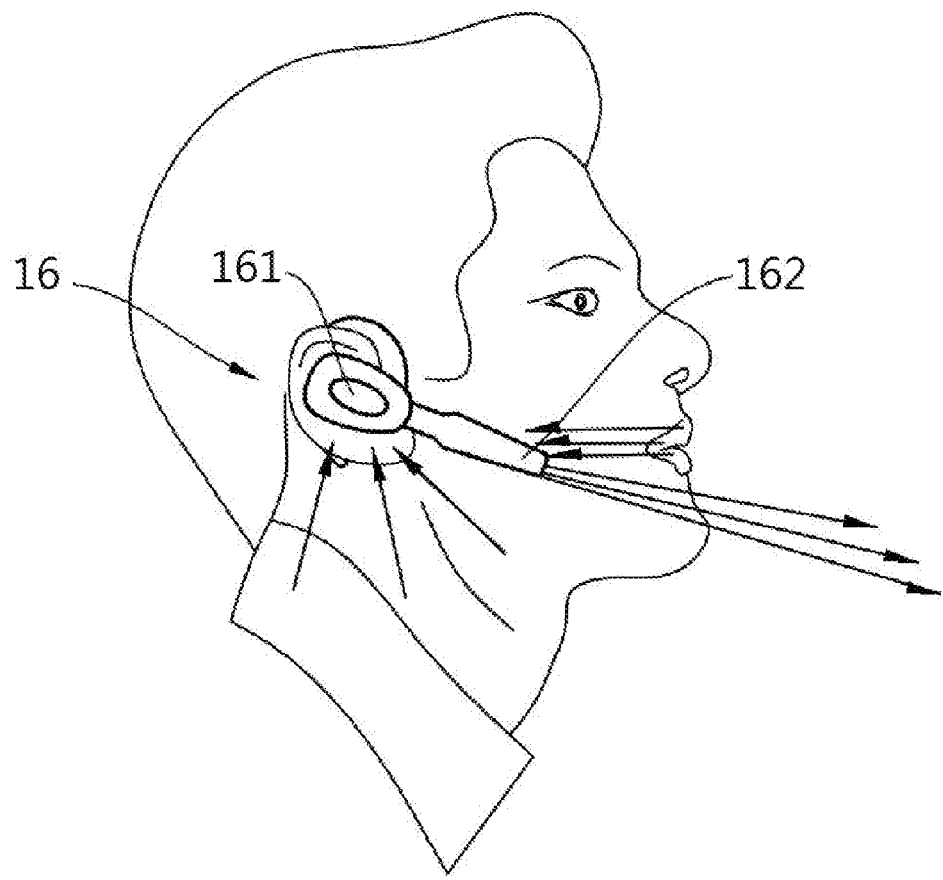
FIG. 3A schematically depicts the first embodiment of the invention.

As shown in FIGS. 3 and 3A specifically, a first embodiment of the invention is shown. The multifunction simultaneous interpretation device 1 is mounted in an earpiece 161 and a microphone 162 of a headset 16 respectively. The audio input and recognition module 11 in the earpiece 161 may detect the language (e.g., English) uttered by a first individual.

In FIG. 3A, arrows pointed to the earpiece 161 represent English spoken by the first individual received by the audio input and recognition module 11 in the earpiece 161. Further, arrows pointed to the microphone 162 represent Chinese spoken by the second individual received by the audio input and recognition module 11 in the microphone 162.

In the earpiece 161, after receiving English spoken by the first individual, the audio input and recognition module 11 sends the input speech signals of English to the interpretation module 12 which in turn interprets and converts same into speech signals of a second language (i.e., target language such as Chinese), and outputs the speech signals of Chinese to the output module 13 in the earpiece 161 as output. In detail, as shown in FIG. 3A, arrows pointed to the earpiece 161 represent English spoken by the first individual received by the audio input and recognition module 11 in the earpiece 161. And in turn, the interpretation module 12 in the earpiece 161 interprets and converts same into speech signals of Chinese, and outputs the speech signals of Chinese to the output module 13 in the earpiece 161. It is noted that the first individual speaks English, and Chinese is the interpreted language that is heard by the second individual.

Further, as shown in FIG. 3A, arrows pointed to the microphone 162 represent Chinese spoken by the second individual received by the audio input and recognition module 11 in the microphone 162. And in turn, the interpretation module 12 in the microphone 162 interprets and converts same into speech signals of English, and outputs the speech signals of English to the output module 13 in the microphone 162. It is noted that the second individual speaks Chinese, and English is the interpreted language that is heard by the first individual.

As a result, a second individual seating in a short distance can hear Chinese corresponding to English spoken by the first individual. Alternatively, the output module 13 is operatively connected to a plurality of microphones each held by one individual of an audience so that each individual of the audience can hear Chinese clearly.

In short, by utilizing the multifunction simultaneous interpretation device 1 an individual may speak a first language and a second individual (or audience) may hear a second language which is different from the first language and understandable to the second individual (or the audience).

Figure 4:
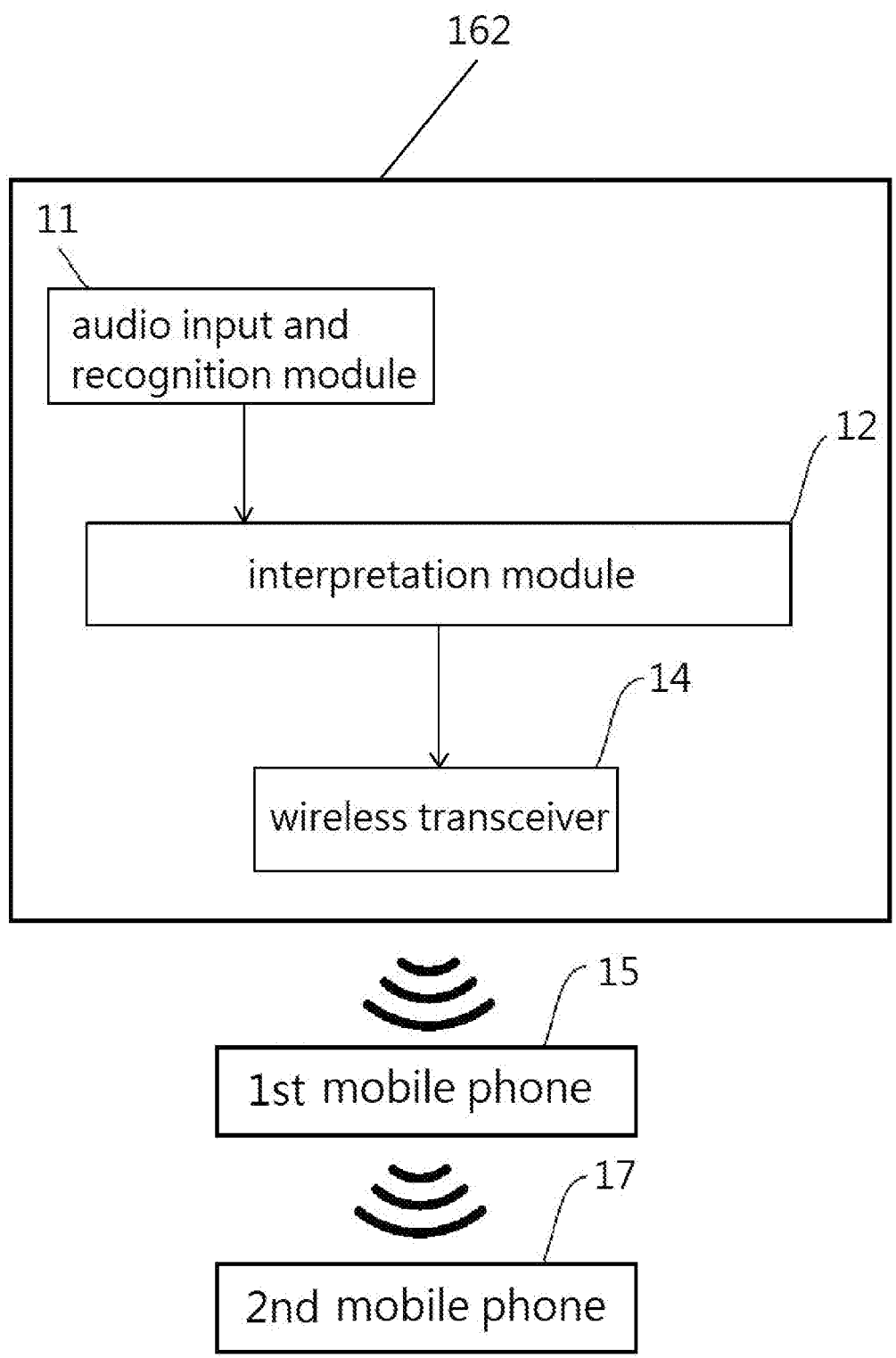
FIG. 4 is a block diagram of a second embodiment of the invention in one way communication.
Figure 5:
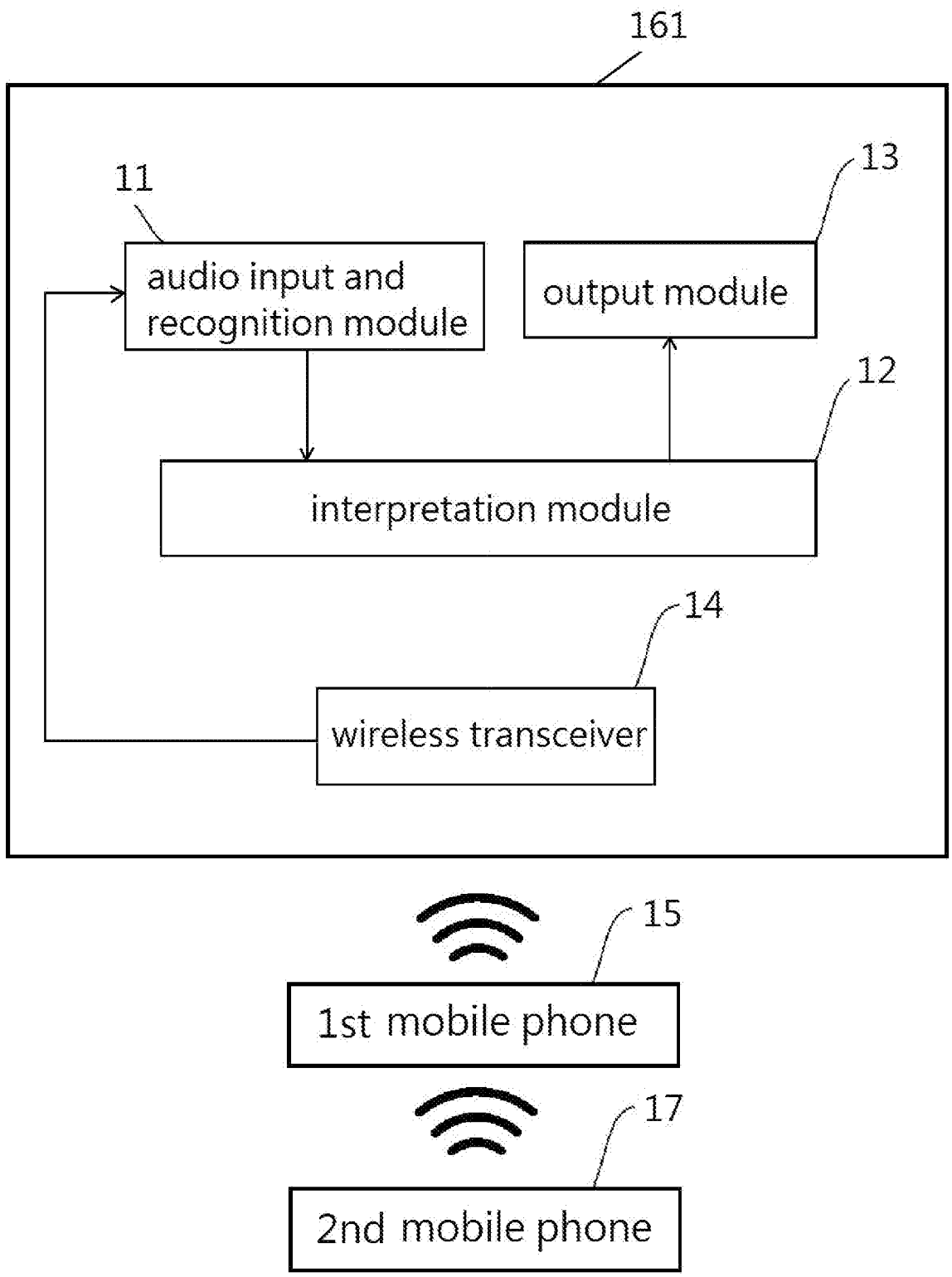
FIG. 5 is a block diagram of the second embodiment of the invention in the other way communication.
Figure 5A:
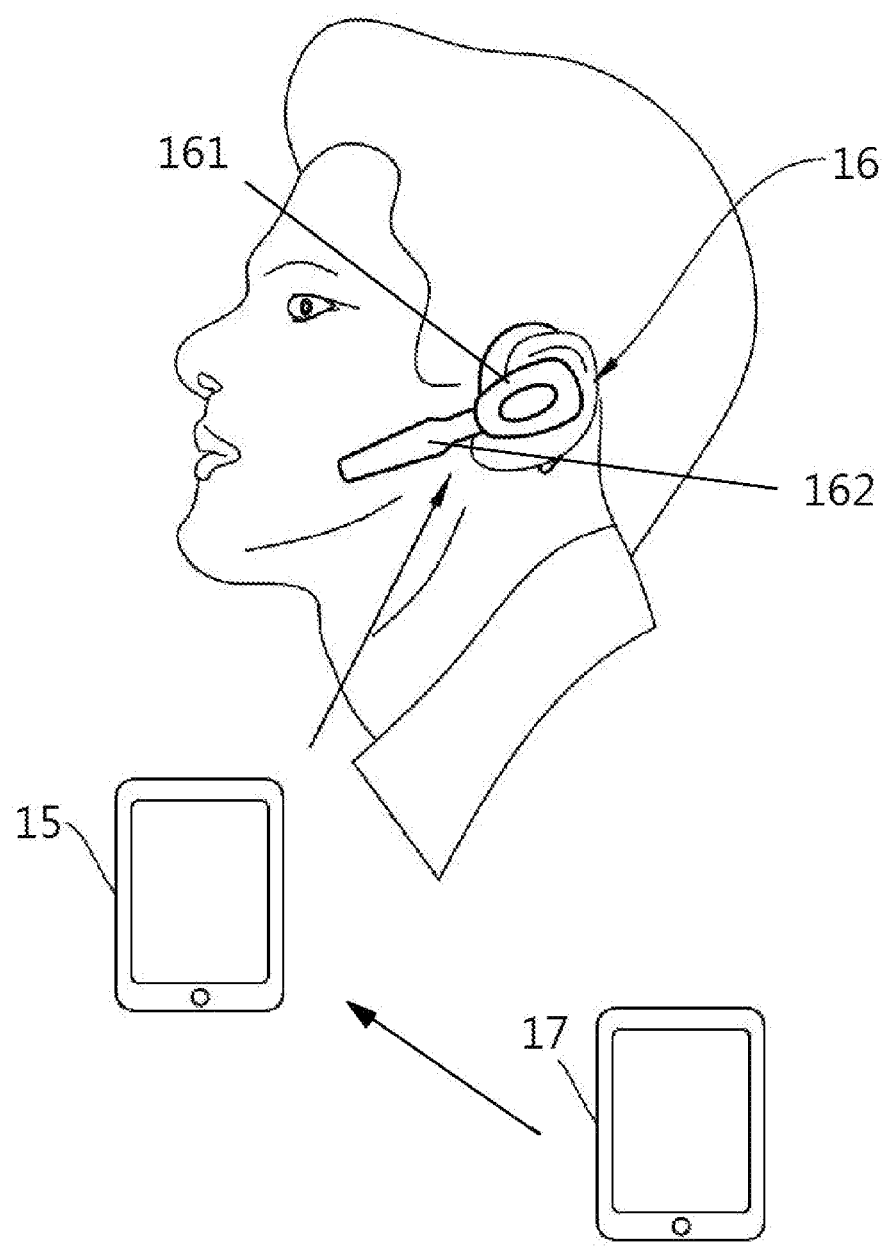
FIG. 5A schematically depicts the other way communication of the second embodiment of the invention.

As shown in FIGS. 4 to 5A, a second embodiment of the invention is shown. The multifunction simultaneous interpretation device 1 is mounted in an earpiece 161 and a microphone 162 of a headset 16 respectively.

Figure 4A:
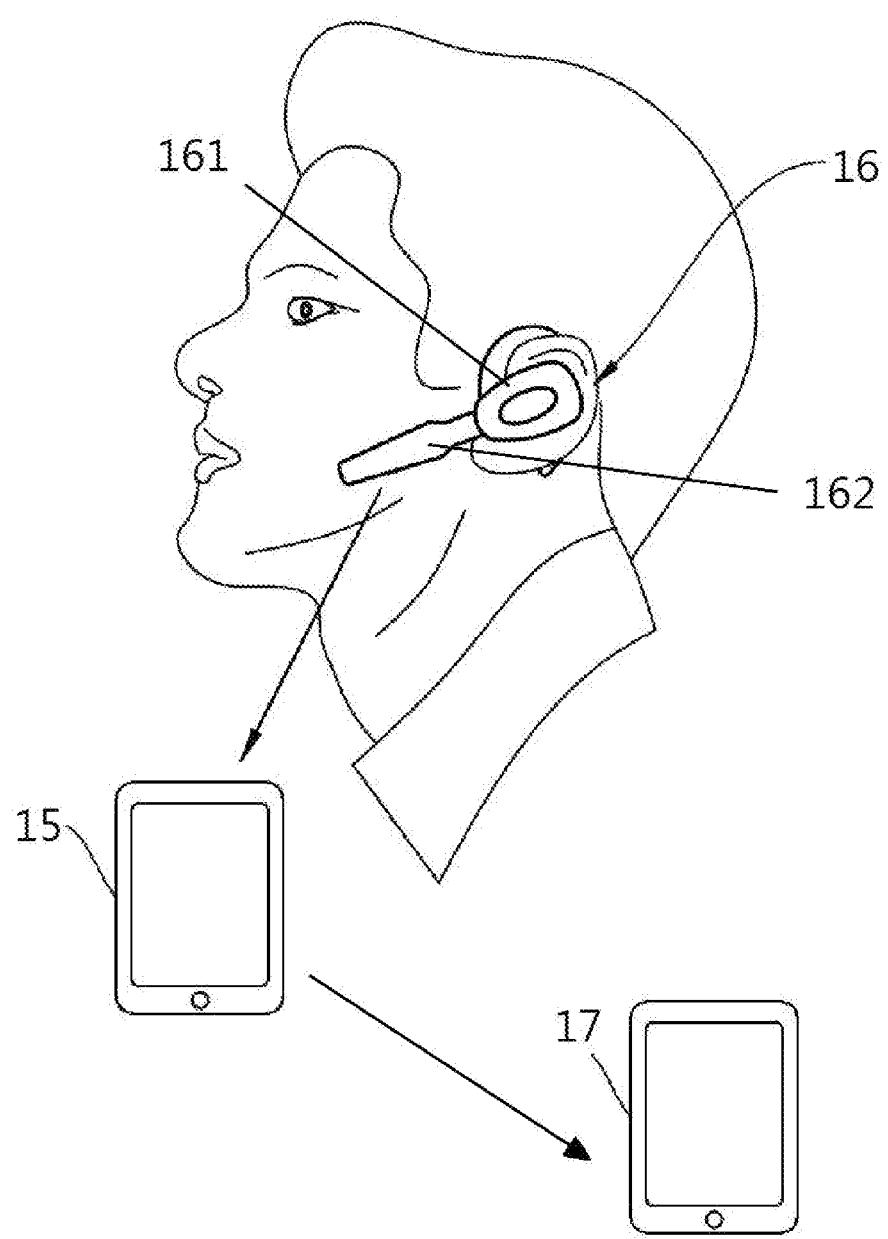
FIG. 4A schematically depicts one way communication of the second embodiment of the invention.

As shown in FIGS. 4 and 4A specifically, the audio input and recognition module 11 in the microphone 162 may detect the language (e.g., English) uttered by a first individual and convert the language into input speech signals of English. Next, the audio input and recognition module 11 in the microphone 162 sends the input speech signals of English to the interpretation module 12 in the microphone 162 which in turn interprets and converts same into speech signals of a second language (i.e., target language such as Chinese), and outputs the speech signals of Chinese to the wireless transceiver 14 in the microphone 162. And in turn, the wireless transceiver 14 wirelessly sends the speech signals of Chinese to a first mobile phone 15 owned by the first individual. Further, the first mobile phone 15 wirelessly sends the speech signals of Chinese to a second mobile phone 17 used by a second individual (see arrow pointed to the first mobile phone 15 and arrow pointed to the second mobile phone 17 in FIG. 4A). As such, the second individual holding the second mobile phone 17 to his or her ear can hear Chinese corresponding to English spoken by the first individual.

As shown in FIGS. 5 and 5A specifically, the second individual may speak the second language (e.g., Chinese) to the second mobile phone 17. And in turn, the second mobile phone 17 wirelessly sends speech signals of Chinese to the first mobile phone 15 which in turn sends the speech signals of Chinese to the wireless transceiver 14 in the earpiece 161 (see arrow pointed to the first mobile phone 15 and arrow pointed to the headset 16 in FIG. 5A). Further, the wireless transceiver 14 sends the received speech signals of Chinese to the audio input and recognition module 11 in the earpiece 161. The audio input and recognition module 11 in the earpiece 161 may detect the language (e.g., Chinese) and convert the language into input speech signals of Chinese. Next, the audio input and recognition module 11 in the earpiece 161 sends the input speech signals of Chinese to the interpretation module 12 in the earpiece 161 which in turn interprets and converts same into speech signals of a second language (i.e., target language such as English), and outputs the speech signals of English to the output module 13 in the earpiece 161. As a result, the first individual wearing a headset 16 in cooperation with a first mobile phone 15 owned by the first individual can hear English corresponding to Chinese spoken by the second individual using a second mobile phone 17.

In short, the multifunction simultaneous interpretation device 1 is capable of making a conversion smoothly between two persons speaking different languages when one person using the interpretation device 1 in cooperation with a first mobile phone 15 to talk with the other person holding a second mobile phone 17, or simultaneously interpreting a first language being spoken by a lecturer using the interpretation device 1 into a second language which is understandable by another person (or every participant of an audience).

Each of the first mobile phone 15 and the second mobile phone 17 may be embedded with APP (i.e., mobile app) corresponding to the wireless transceiver 14 in the headset 16. Thus, voice input or output can be made by both the first mobile phone 15 and the second mobile phone 17 in cooperation with the headset 16.

The invention has the following advantages and benefits in comparison with the conventional art:

Face to face simultaneous interpretation from one language to another different language is made possible by making the audio input and recognition module, the interpretation module and the output module co-operate one another.

Remote simultaneous interpretation from one language to another different language and vice versa is made possible by making the audio input and recognition module, the interpretation module, the output module, the wireless transceiver, the first mobile phone, and the second mobile phone cooperate one another in a two-communication mode.

Audience simultaneous interpretation from one language to another different language is made possible by using the microphone of the headset.

While the invention has been described in terms of preferred embodiments, those skilled in the art will recognize that the invention can be practiced with modifications within the spirit and scope of the appended claims.

What is claimed is:

1. A multifunction simultaneous interpretation device, comprising:
    an audio input and recognition module configured to receive input speech of a first language, recognize same, and convert the input speech of the first language into input speech signals of the first language;
    an interpretation module electrically connected to the audio input and recognition module and configured to receive the input speech signals of the first language, interpret and convert same into speech signals of a second language different from the first language, and make the speech signals of the second language as output;
    an output module electrically connected to the interpretation module and configured to receive the speech signals of the second language from the interpretation module and output a voice representing the speech signals of the second language; and
    a wireless transceiver electrically connected to the interpretation module and configured for wireless signal transmission to a first mobile phone which is configured for further wireless signal transmission to a second mobile phone;
    wherein the multifunction simultaneous interpretation device is implemented as a headset;
    wherein the multifunction simultaneous interpretation device is disposed in an earpiece and a microphone of the headset respectively;
    wherein each of the first and second mobile phones is embedded with an APP corresponding to a wireless transceiver in the headset; and
    wherein the interpretation module includes a plurality of language chips each for interpreting one of a plurality of first languages into one of a plurality of second languages, and an expansion unit operatively connected to the language chips and configured to expand data stored in the language chips.

* * * * *